United States Patent Office 3,118,755
Patented Jan. 21, 1964

1

3,118,755
METHOD OF DESTROYING GROWING WEEDS
Sidney B. Richter, Chicago, Ill., assignor to Velsicol Chemical Corporation, Chicago, Ill., a corporation of Illinois
No Drawing. Original application Oct. 15, 1958, Ser. No. 767,264, now Patent No. 3,013,058, dated Dec. 12, 1961. Divided and this application Nov. 28, 1961, Ser. No. 155,455
12 Claims. (Cl. 71—2.6)

This invention relates to new herbicidal compositions of matter. More specifically, this invention relates to the control of undesirable plant life with 2-methoxy-3,6-dichlorophenylacetic acid, its anhydride, its amides, its esters, its alkali metal salts, or its amine salts. 2-methoxy-3,6-dichlorophenylacetic acid, which has the structure

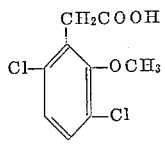

will hereinafter be referred to as compound I. This chemical compound and its derivatives as cited above have marked activity as herbicides useful for the control of undesirable plant life.

Compound I can be prepared readily from the known compound 2,5-dichlorophenol. An aqueous solution of an alkali metal salt of the phenol is treated with acetic anhydride with ice cooling to convert it to the ester, 2,5-dichlorophenyl acetate. Rearrangement of the phenol ester to the ortho-hydroxy methyl ketone, namely methyl 2-hydroxy-3,6-dichlorophenyl ketone, is effected by heating the ester with about 1.2 to 1.3 molar equivalents of anhydrous aluminum chloride at temperatures from about 120 to 150° C. The resulting hydroxy ketone is then converted to methyl 2-methoxy-3,6-dichlorophenyl ketone by treatment with an alkali metal hydroxide and an excess of dimethyl sulfate. The reaction mixture is cooled during the addition of dimethyl sulfate but is later refluxed to complete the methylation reaction. The methoxy ketone is then converted to 2-methoxy-3,6-dichlorophenylacetamide by treatment with ammonium polysulfide reagent, which is prepared by saturating concentrated aqueous ammonia with hydrogen sulfide and dissolving in the solution 10% by weight of sulfur to form a clear, deep red solution. About 5 cc. of the reagent is used for each gram of the methoxy ketone. The reaction is favored by the use of dioxane as solvent in the ratio of four volumes to every five volumes of ammonium polysulfide reagent. The reaction is carried out in a pressure vessel such as a sealed tube, or a metal pipe or an autoclave can be used for larger quantities. Temperatures below about 180° C., preferably 150-165° C., are used, and the reaction is complete in 12 to 24 hours or less. The resulting amide is hydrolyzed in acid or basic media. For example, the amide can be refluxed with 50% sulfuric acid solution. The cooled reaction mixture is poured into ice water, and the resulting product is filtered off and washed with water. The compound I obtained in this manner is suitable for many herbicidal uses as such, but it can be purified, for example, by crystallization from a suitable solvent.

The anhydride of compound I is prepared by the removal of one molecule of water from two molecules of compound I as the free acid. In practice, it is convenient to prepare the anhydride by the acylation of the free carboxylic acid by its acid halide in the presence of a strong acylating agent such as pyridine. Thus a mixture of dry pyridine and dry benzene are treated with 1 mole

2 of the acid chloride of compound I. The slightly exothermic reaction proceeds with the formation of an intermediate pyridinium salt. One mole of compound I as the free acid is then added, the precipitate of pyridine hydrochloride is removed, and the anhydride and compound I is isolated by removal of the benzene.

The acid halide of compound I required in the above and other syntheses is prepared by the reaction of the free acid with a phosphorus trihalide in the conventional manner. Thus the treatment of compound I with phosphorus trichloride until the reaction ceases produces the acid chloride of compound I.

Compounds which are salts, esters, or amides of compound I can be prepared readily from the free acid. Thus treatment of the free acid with ammonium hydroxide gives a product which is the salt ammonium 2-methoxy-3,6-dichlorophenylacetate. Similarly, an alkali metal salt of compound I can be made by the treatment of the free acid with bases, such as the hydroxides, of alkali metals. Treatment of the acid with sodium hydroxide thus gives the salt sodium 2-methoxy-3,6-dichlorophenylacetate as the product, while the use of potassium hydroxide gives the salt potassium 2-methoxy-3,6-dichlorophenylacetate.

Amine salts of compound I are prepared by the addition of the free acid to various amines. Typical amines which can be used to prepare such amine salts are dimethylamine, trimethylamine, triethylamine, diethanolamine, triethanolamine, isopropylamine, morpholine, and the like. The resulting products are, respectively, the dimethylamine, trimethylamine, triethylamine, diethanolamine, triethanolamine, isopropylamine, and morpholine salts of 2-methoxy-3,6-dichlorophenylacetic acid.

Esters of compound I are prepared by the condensation of the acid with various alcohols. Thus the condensation of methyl alcohol with compound I gives the desired ester, methyl 2-methoxy-3,6-dichlorophenylacetate. Other typical alcohols which can be used are propyl, isopropyl, n-butyl, sec-butyl, isobutyl, tert-butyl, amyl, hexyl, heptyl, octyl, nonyl, decyl, and the like. The products are the corresponding alkyl esters of 2-methoxy-3,6-dichlorophenylacetic acid. Although such complex esters as those prepared by the esterfication of compound I with butoxyethanol, propylene glycol butyl ether, and the like are useful products in accordance with this invention, preferred esters are those in which the esterifying group is an unsubstituted alkyl group which contains from 1 to 10 carbon atoms. The condensation of the acid with the alcohol is carried out suitably in an inert solvent such as an aromatic hydrocarbon and in the presence of a few percent by weight of an acid catalyst such as p-toluenesulfonic acid. The water which forms during the esterification reaction can be removed continuously in many cases from the reaction mixture by distillation as it forms, and its volume can be measured to determine when the esterification is complete. The ester is then isolated by distillation of the inert solvent.

Amides of compound I can be prepared conveniently by the reaction of the acid halide of compound I with ammonia or various amines. The reaction can be carried out in an inert solvent such as ether or benzene. Preferably two moles of the amine are used for each mole of the acid halide employed, since the hydrogen halide released during the reaction is taken up by some of the free amine which remains. The simplest amide, 2-methoxy-3,6-dichlorophenylacetamide, can be prepared by the reaction of the acid chloride of compound I with ammonia, either as the free gas or as an aqueous solution. This amide can also be prepared by hydrolysis of the corresponding nitrile. Substituted amides are prepared by the reaction of the acid halide of compound I with amines such as any of the primary or secondary amines suggested above for the preparation of the amine salts of compound I. Thus, for example, the reaction of the acid chloride of compound I with methylamine, butylamine, decylamine, or diethylamine gives the N-methyl-, N-butyl-, N-decyl-, or N,N-diethyl-2-methoxy-3,6-dichlorophenylacetamides, respectively. While more complex amines such as the aromatic amines can be used as the amine reactant to give desirable products, which are specifically named as anilides, preferred amine reactants are alkylamines containing up to 10 carbon atoms.

For practical use as herbicides, the compounds of this invention are formulated with inert carriers to obtain proper concentrations and to facilitate handling. For example, these compounds can be formulated into dusts by combining them with such inert substances as talc or clays. The alkali metal salts of compound I are particularly suited to such dust formulations, and dusts containing from 5 to 25 percent by weight of active compound are convenient for use in the field. The compounds of this invention, however, are preferably applied as sprays. These can be made as simple solutions by dissolving the compounds in organic solvents such as xylene, kerosene, or the methylated naphthalenes. The esters of compound I, which ordinarily are liquids at room temperature, are particularly suited to formulation by this method. The amine salts of compound I often show good solubility in water and can be used directly as aqueous solutions.

The compounds of this invention can also be emulsified or suspended in water by the addition of emulsifiers and wetting agents. The formulations of these active herbicidal compounds are either applied directly to the plants to be controlled, or the soil in which the plants are growing can be treated. Substances such as other pesticides, stabilizers, activators, synergists, spreaders and adhesives can be added to the formulations if desired. There is no significant difference in effect from the amount of water or organic solvent for diluting these herbicides, providing the same amount of chemical is distributed evenly over a given area. Such distribution can be obtained, for example, with low-pressure, low-volume sprays at the rate of about 10 gallons of spray per acre.

In applying the herbicidal compounds, consideration must be given to the nature and stage of growth of the crop, the species of weeds present, the stage of growth of the weeds, environmental factors influencing the rate and vigor of the weed growth, weather conditions at the time of application and immediately following, and the dosage to be applied to a given area. Weeds are most susceptible when they are small and growing rapidly. Early application, therefore, results in better control with less chemical and increased yields because of the early destruction of the competing weeds. The larger and older the weeds the higher the concentration needed to kill them. Summer annuals such as lamb's-quarters, pigweeds, cocklebur, and sunflower should be sprayed when they are less than 4 inches high. Winter annuals such as various mustards, fan-weed, yellow star-thistle, and wild radish are most easily killed while they are still in the rosette stage. Usually weeds growing rapidly under optimum conditions are relatively susceptible, whereas those growing under adverse conditions tend to be resistant to the herbicide sprays.

The effectiveness of the compounds of this invention in small quantities makes them economically sound for weed control on large areas, with a great saving in labor and cost, in addition to corresponding crop increases. These compounds are particularly valuable in weed control because they are harmful to many weeds but harmless or relatively harmless to some cultivated crops. Minute quantities in contact with plant tissues may be absorbed and translocated to all parts of the plant, causing striking changes in the form and functions and often resulting in their death. The actual amount of compound to be used depends on a variety of factors but is influenced primarily by the species of undesirable plant to be controlled. Thus while fractions of a pound of actual compound I or its equivalent of an ester, salt, amide, or the anhydride of compound I are often sufficient for postemergence weed control on an acre of corn, seed flax, perennial grass seed crops, pastures or grazing areas (without legumes), wheat, and the like, the particular species of weeds encountered in evergreen and deciduous dormant nursery stock, nursery conifers, waste areas, woody brush, and the like may require the use of one or more pounds of compound I or its derivatives per acre for good control. Dosage adjustments with the low-volume, low-pressure applications suggested can be made by changing the nozzle size, nozzle spacing, pressure, or traveling rate of the spray equipment.

The manner in which the herbicidal compounds of this invention can be prepared and utilized is illustrated in the following examples:

EXAMPLE 1

*Preparation of Methyl 2-Methoxy-3,6-Dichlorophenyl Ketone*

2,5-dichlorophenol (81 g.; 0.5 mole), which can be obtained, for example, as described by Kohn and Fink in Monatsh., vol. 58, p. 78 (1931), is dissolved in a solution of sodium hydroxide (20 g.; 0.5 mole) in 500 ml. of water in a 1-liter, round-bottomed flask fitted with a mechanical stirrer, dropping funnel, and internal thermometer. The flask is surrounded with crushed ice, and the reaction mixture is cooled to 20° C. Acetic anhydride (25 g.; 0.25 mole) is added dropwise to the vigorously stirred mixture, which is then stirred for an additional hour at room temperature. The mixture is then extracted with three 200-ml. portions of ether. The combined ether extracts are dried over magnesium sulfate and filtered. Distillation of the ether gives a residue of 2,5-dichlorophenyl acetate, which is purified by distillation in vacuo.

The 2,5-dichlorophenyl acetate (1.0 mole) is mixed with anhydrous aluminum chloride (1.3 moles) in a 500-ml., round-bottomed flask fitted with an internal thermometer, reflux condenser, and mechanical stirrer. The mixture is stirred and heated to 120–150° C., and the temperature is maintained in this range for 1 hour. The cooled reaction mixture is treated with ice and 10% hydrochloric acid and then is extracted with three 200-ml. portions of ether. The ether extracts are extracted thoroughly with a 7.5% aqueous potassium hydroxide solution, and the basic extract is acidified with 25% hydrochloric acid to separate the free methyl 2-hydroxy-3,6-dichlorophenyl ketone.

The ketone (102. g.) is dissolved in a solution of sodium hydroxide (20 g.) in 200 cc. of water in a 1-liter, round-bottomed flask fitted with a reflux condenser, mechanical stirrer, and dropping funnel. The mixture is cooled to 0° C. with an ice bath, and dimethyl sulfate (63 g.) is added dropwise with stirring. The reaction mixture is stirred and refluxed for 0.5 hour, after which another 102 g. of ketone and 20 g. of sodium hydroxide in 200 cc. of water are added. The mixture is then stirred and refluxed for 10 hours, cooled, and extracted with three 300-ml. portions of ether. The combined ether extracts are dried over magnesium sulfate and filtered. Distillation of the ether in vacuo gives a residue of methyl 2-methoxy-3,6-dichlorophenyl ketone.

EXAMPLE 2

*Preparation of 2-Methoxy-3,6-Dichlorophenylacetic Acid (Compound I)*

A mixture of 20 g. of methyl 2-methoxy-3,6-dichlorophenyl ketone, 80 cc. of dioxane, and 100 cc. of concentrated aqueous ammonia saturated with hydrogen sulfide and containing 10 g. of sulfur is heated in an iron tube 2 inches in diameter fitted with an iron screw cap and having a capacity of 350 cc. The screw cap is sealed, and the tube is heated at 165° C. for 24 hours. When the tube is cooled, it is opened, and the reaction mixture is washed out with methanol. The solvents are distilled off in vacuo. The residue (20 g.) is stirred and refluxed for 6 hours with a mixture of 100 cc. of water and 100 cc. of concentrated sulfuric acid in a 500 ml. round-bottomed flask fitted with a reflux condenser and mechanical stirrer. The cooled mixture is poured slowly with stirring into 2 liters of ice water. The product is filtered, washed with cold water, pressed dry, and dried completely in a vacuum oven to give the desired compound I.

EXAMPLE 3

*Preparation of the Sodium Salt of Compound I*

Compound I (0.5 mole) is dissolved in 500 cc. of methanol and treated with a solution of sodium hydroxide (20 g.; 0.5 mole) in 100 cc. of methanol. The methanol is removed by distillation in vacuo on the steam bath, and the solid residue is slurried with 100 cc. of cold, dry ether, filtered, pressed dry, and dried completely in a vacuum oven to give the desired sodium salt of Compound I.

EXAMPLE 4

*Preparation of the Ammonium Salt of Compound I*

Treatment of compound I (0.5 mole) in 500 cc. of methanol with 34 cc. of commercial concentrated ammonium hydroxide according to the method given in the previous example gives the desired ammonium salt of compound I.

EXAMPLE 5

*Preparation of the Dimethylamine Salt of Compound I*

Compound I (0.5 mole) is dissolved in 500 cc. of dry ether and treated with dimethylamine (22.5 g.; 0.5 mole). The solid which separates is filtered, washed twice with 100 cc. portions of cold ether, filtered, pressed dry, and dried completely in a vacuum oven to give the desired dimethylamine salt of compound I.

EXAMPLE 6

*Preparation of the Diethanolamine Salt of Compound I*

In the manner described in the previous example, compound I (0.5 mole) is treated with diethanolamine (52.5 g.; 0.5 mole) in 500 cc. of dry ether. The product which is isolated is the diethanolamine salt of compound I.

EXAMPLE 7

*Preparation of the Morpholine Salt of Compound I*

Compound I (0.5 mole) is treated with morpholine (43.5 g.; 0.5 mole) in 500 cc. of ether, and the product is worked up as described for the preparation of the dimethylamine salt to give the desired morpholine salt of compound I.

EXAMPLE 8

*Preparation of the Ethyl Ester of Compound I*

Compound I (0.5 mole), ethyl alcohol (23 g.; 0.5 mole), and 3.0 g. of p-toluenesulfonic acid are dissolved in 500 ml. of benzene, and the solution is placed in a 1-liter, round-bottomed flask fitted with a reflux condenser and a calibrated Dean-Stark tube. The solution is heated at reflux temperature until 9 cc. of water have been collected in the Dean-Stark tube. The cooled reaction mixture is then extracted twice with 50 cc. portions of 10% sodium carbonate solution, and filtered. The benzene is distilled off in vacuo on the steam bath, and the residue is then distilled in vacuo to give the desired ethyl ester of compound I.

EXAMPLE 9

*Preparation of the Decyl Ester of Compound I*

In the manner and apparatus described in the previous example, compound I (0.5 mole) and normal primary decyl alcohol (79 g.; 0.5 mole) are refluxed in 500 ml. of benzene in the presence of 3.0 g. of p-toluenesulfonic acid until 9 cc. of water have been distilled from the reaction mixture. Work-up of the reaction mixture as described in the previous example gives the desired decyl ester of compound I.

EXAMPLE 10

*Preparation of the n-Butyl Ester of Compound I*

The reaction of compound I (0.5 mole) and n-butyl alcohol (37 g.; 0.5 mole) by the method described above for the preparation of the ethyl ester is used to prepare the n-butyl ester of compound I.

EXAMPLE 11

*Preparation of the Acid Chloride of Compound I*

Compound I (1 mole) is placed with 500 cc. of dry benzene in a 2-liter, 3-necked, round-bottomed flask fitted with a mechanical stirrer, reflux condenser (calcium chloride tube), and dropping funnel. Phosphorus trichloride (123 g.; 0.9 mole) is added slowly dropwise with vigorous stirring while the reaction flask is cooled with cold water if necessary to control the reaction. When all the $PCl_3$ has been added and the evolution of hydrogen chloride has ceased, the reaction mixture is then transferred to distillation apparatus, and the solvent is distilled off. The residue is then distilled in vacuo to give the desired acid chloride of compound I.

EXAMPLE 12

*Preparation of the Amide of Compound I*

One mole of the acid chloride of compound I is placed with 500 cc. of dry benzene in a 1-liter, 3-necked flask fitted with a reflux condenser, mechanical stirrer, and a gas inlet tube having a sparger tip. The mixture is stirred while dry ammonia gas is passed into the mixture for several hours. When the ammonia gas is no longer taken up, the precipitated salt is filtered off and extracted twice with 100 ml. portions of ether. The ether extracts and benzene filtrate are dried over magnesium sulfate and filtered, and the solvents are distilled off to give the desired amide of compound I.

EXAMPLE 13

*Preparation of the N-n-Decylamide of Compound I*

One mole of the acid chloride of compound I and 500 ml. of dry benzene are placed in a 2-liter, 3-necked, round-bottomed flask fitted with a mechanical stirrer, reflux condenser, internal thermometer, and dropping funnel. n-Decylamine (314 g.; 2.0 moles) in 250 ml. benzene is added dropwise with vigorous stirring. When all the amine has been added, the reaction mixture is refluxed for 2 hours and cooled, after which the precipitated salt is filtered off and extracted with two 100 ml. portions of ether. The ether extracts and benzene filtrate are dried over magnesium sulfate and filtered. Distillation of the solvents gives the desired N-n-decylamide of compound I.

EXAMPLE 14

*Preparation of the N,N-Diethylamide of Compound I*

One mole of the acid chloride of compound I is treated with diethylamine (146 g.; 2.0 moles) in the manner and apparatus described in the previous example to give the N,N-diethylamide of compound I.

EXAMPLE 15

*Preparation of the Anhydride of Compound I*

Dry pyridine (158 g.; 2.0 moles) and 1 liter of dry benzene are placed in a 2-liter, 3-necked, round-bottomed flask fitted with a dropping funnel, mechanical stirrer, reflux condenser, and internal thermometer. One mole of the acid chloride of compound I, which is prepared as described in a previous example, is added rapidly with stirring to the reaction mixture. Compound I (1 mole) is then added in portions over a period of about 10 minutes with rapid stirring. The pyridine hydrochloride which precipitates is filtered off, and the benzene is distilled from the filtrate in vacuo. The residue contains the desired anhydride of compound I, which can be purified by crystallization from a suitable solvent.

EXAMPLE 16

*Preparation of an Emulsifiable Concentrate of Compound I*

The following concentrate is prepared by mixing the ingredients intimately in the given percentage proportions by weight:

| | Percent |
|---|---|
| Compound I | 25 |
| Antarox A-400 | 40 |
| Methanol | 35 |

"Antarox A-400" is the trade name under which a nonionic detergent of the aromatic polyethylene glycol ether type is sold. The above concentrate is diluted with water to the desired concentration for use.

EXAMPLE 17

*Preparation of an Emulsifiable Concentrate of the n-Butyl Ester of Compound I*

The following ingredients are mixed thoroughly in the given percentage proportions by weight:

| | Percent |
|---|---|
| n-Butyl ester of compound I | 59 |
| Xylene | 10 |
| Triton X-100 | 5 |
| Kerosene | 26 |

"Triton X-100" is the trade name under which an emulsifier of the alkyl aryl polyether alcohol type is sold. The above concentrate is diluted with water to the desired concentration for use.

EXAMPLE 18

*Preparaion of a Dust From the Sodium Salt of Compound I*

The sodium salt of compound I (10% by weight) and talc (90% by weight) are combined and ground to the desired particle size in a mechanical grinder-blender.

The herbicidal activity of chemical compounds is often demonstrated by the ability of the chemicals to kill or arrest the growth of tomato plants. The tomato plant is readily grown and maintained under uniform conditions for experimental purposes in greenhouses, and its response to chemicals is very similar to that observed for a wide variety of economically important species of undesirable plant life in the field.

The herbicidal activity of the compounds of this invention, for example, can be demonstrated in greenhouse experiments on young potted tomato plants (Bonny Best variety). The compounds are formulated into 10 percent wettable powders and are dispersed in water at a concentration of 2000 parts per million actual chemical. Ten milliliters of an aliquot portion of the dispersion is added to the soil surface of the tomato plants, approximately 5 to 7 inches tall. In order to avoid undue concentration or accumulation of the chemical in any given area, 5 holes the size of a pencil and about 1 inch deep are punched in the soil surface around the shoot, and the 10 milliliter application is divided equally among the 5 holes. Three plants are used for each application. The treated plants are held under greenhouse conditions for 7 days, provided with subterranean watering, and observed for response to treatment. The results indicate a high order of herbicidal toxicity of the compounds of this invention.

This application is a division of my co-pending application Serial No. 767,264 filed October 15, 1958, now Patent No. 3,013,058.

I claim:

1. A method of destroying growing weeds which comprises contacting said weeds with a herbicidal composition comprising an inert carrier and as the essential active ingredient, in a quantity which is herbicidally toxic to said weeds, a compound selected from the group consisting of 2-methoxy-3,6-dichlorophenylacetic acid, its anhydride, its alkali metal salts, its alkyl and alkanol amine salts wherein the amine component contains up to ten carbon atoms, its ammonium salt, its morpholine salt, its esters in which the esterifying group is an unsubstituted alkyl group containing from one to ten carbon atoms, its unsubstituted amide, and its alkyl amides wherein the amine component contains up to ten carbon atoms.

2. The method of claim 1, wherein the compound is an alkali metal salt of 2-methoxy-3,6-dichlorophenylacetic acid.

3. The method of claim 1, wherein the compound is an alkyl amine salt of 2-methoxy-3,6-dichlorophenylacetic acid in which the amine component contains up to ten carbon atoms.

4. The method of claim 1, wherein the compound is an alkanol amine salt of 2-methoxy-3,6-dichlorophenylacetic acid in which the amine component contains up to ten carbon atoms.

5. The method of claim 1, wherein the compound is an ester of 2-methoxy-3,6-dichlorophenylacetic acid in which the esterifying group is an unsubstituted alkyl group containing from one to ten carbon atoms.

6. The method of claim 1, wherein the compound is an alkyl amide of 2-methoxy-3,6-dichlorophenylacetic acid in which the amine component contains up to ten carbon atoms.

7. The method of claim 1, wherein the compound is 2-methoxy-3,6-dichlorophenylacetic acid.

8. The method of claim 1, wherein the compound is sodium 2-methoxy-3,6-dichlorophenylacetate.

9. The method of claim 1, wherein the compound is the dimethyl amine salt of 2-methoxy-3,6-dichlorophenylacetic acid.

10. The method of claim 1, wherein the compound is methyl 2-methoxy-3,6-dichlorophenylacetate.

11. The method of claim 1, wherein the compound is bis(2-methoxy-3,6-dichlorophenylacetic) anhydride.

12. The method of claim 1, wherein the compound is 2-methoxy-3,6-dichlorophenylacetamide.

References Cited in the file of this patent

UNITED STATES PATENTS

| 2,394,916 | Jones | Feb. 12, 1946 |
| 2,977,212 | Tischler | Mar. 28, 1961 |